United States Patent

Garrand et al.

[11] Patent Number: 5,363,871
[45] Date of Patent: Nov. 15, 1994

[54] INFANT SUN SHIELD

[76] Inventors: Michael L. Garrand, Rte. 1, Box 111B; Margo A. Garrand, Rte. 1, Box 112B, both of Stephens City, Va. 22655

[21] Appl. No.: 861,004
[22] Filed: Mar. 31, 1992
[51] Int. Cl.⁵ ............................................. E04H 15/04
[52] U.S. Cl. ........................................ 135/90; 135/96; 135/117; 5/416; 297/184.13
[58] Field of Search .................. 135/900, 90, 96, 117; 297/184, 184.13, 184.1; 5/414, 416, 113

[56] References Cited

U.S. PATENT DOCUMENTS

| 4,030,748 | 7/1977 | Brock | 297/184 |
|---|---|---|---|
| 4,112,957 | 9/1978 | Biven | 135/56 |
| 4,179,053 | 12/1979 | Figura | 224/190 |
| 4,237,914 | 12/1980 | Gantz | 135/96 |
| 4,784,433 | 11/1988 | Purnell-Ayres | 297/184 |
| 4,848,825 | 7/1989 | Niernberger | 296/95.1 |
| 4,865,381 | 9/1989 | Van Rogue | 135/96 |
| 4,883,315 | 11/1989 | Ferguson | 135/96 |
| 4,883,315 | 11/1989 | Ferguson | 297/184 |
| 4,923,249 | 5/1990 | Mattox | 297/184.13 |
| 5,007,674 | 4/1991 | Franc | 297/184 |

FOREIGN PATENT DOCUMENTS 2237190 5/1991 United Kingdom ................ 297/184

Primary Examiner—Carl D. Friedman
Assistant Examiner—Christopher-Todd Kent
Attorney, Agent, or Firm—Jay M. Cantor

[57] ABSTRACT

A rigid substantially planar sheet, preferably but not limited to a rectangular shape, having a central fold region and a pair of fold regions spaced from opposing ends of the rectangle with a fastener, preferably hook and loop (Velcro), disposed in the regions between each of the pair of folds and the sheet end. There is also provided an attachment device, preferably containing hook and loop thereon, for attachment to an infant seat or other device as well as to the fasteners on the sheet via the hook and loop for securing the sheet to the seat. The sheet is dimensioned to have a V shape at the central fold when attached to the fasteners and in operating position.

16 Claims, 2 Drawing Sheets

INFANT SUN SHIELD

BACKGROUND OF THE INVENTION

1. Field of the Invention

This invention relates to a removably mountable sun shield and, more specifically, to a sun shield removably mountable on an infant seat, such as a car seat.

2. Brief Description of the Prior Art

A problem often encountered in the transport of infants is that, during such transport, the sun rays will, on occasion, be directed onto the infant. The intense energy provided by the sun rays can have a detrimental effect on infants, especially since infants are unable to shield themselves therefrom. It is therefore desirable to provide a shield to protect the infants from such rays.

The prior art has attempted to alleviate this problem by providing sun shades for use in conjunction with infant car seats. Examples of such prior art sun shades are shown in U.S. Pat. Nos. of Franc (5,007,674) and Ferguson (4,883,315). While such prior art does perform the function for which it is intended, it is readily apparent that, in the case in which the shield is permanently affixed to the car seat, the shield presents an impediment to easy seating and removal of the infant from the seat and is often not readily and easily removable when not in use. In the case of the removable shield, it lacks any kind of rigid structural support and is thus more prone to collapsing downward or side-to-side. Also, in the event of collapse onto the baby's face, such prior art would tend to conform to the shape of the baby's face, thus presenting a risk of suffocation.

SUMMARY OF THE INVENTION

In accordance with the present invention, the above noted problems of the prior art are minimized and there is provided an easily attachable and removable sun shield for use in conjunction with an infant seat which is also easily storable with minimum space utilization, high strength and stability and minimal likelihood of conforming to the baby's face in the unlikely event of collapse.

Briefly, there is provided a substantially rigid substantially planar sheet, preferably but not limited to a rectangular shape, having a central fold region and a pair of fold regions spaced from opposing ends of the rectangle with a fastener, preferably hook and loop (Velcro), disposed in the regions between each of the pair of folds and the sheet end. There is also provided an attachment device, preferably containing hook and loop thereon, for attachment to an infant seat or other device as well as to the fasteners on the sheet via the hook and loop for securing the sheet to the seat. The sheet is dimensioned to have a V shape at the central fold when attached to the fasteners and in operating and assembled position.

DESCRIPTION OF THE PREFERRED EMBODIMENT

Figure 1:
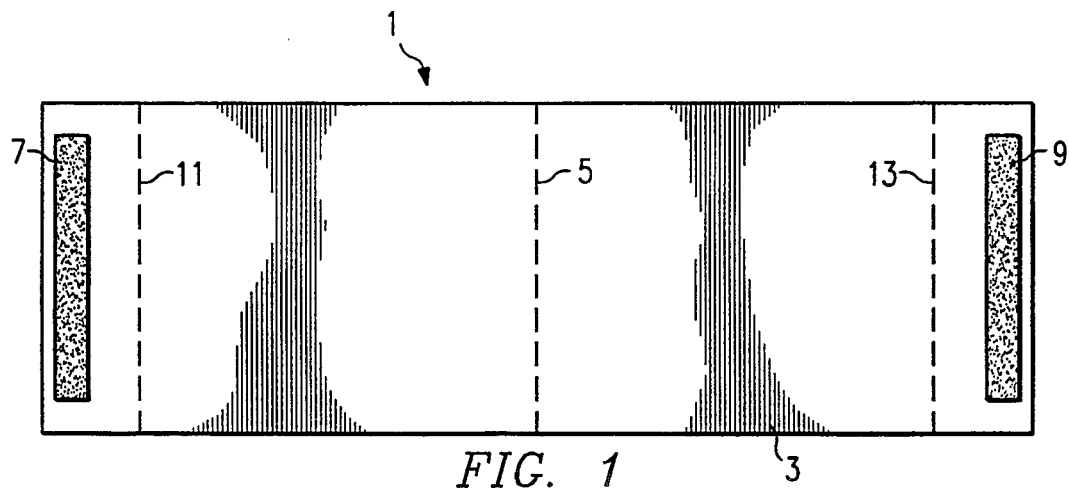
FIG. 1 is a bottom view of a sun shield in accordance with the present invention.
Figure 2:
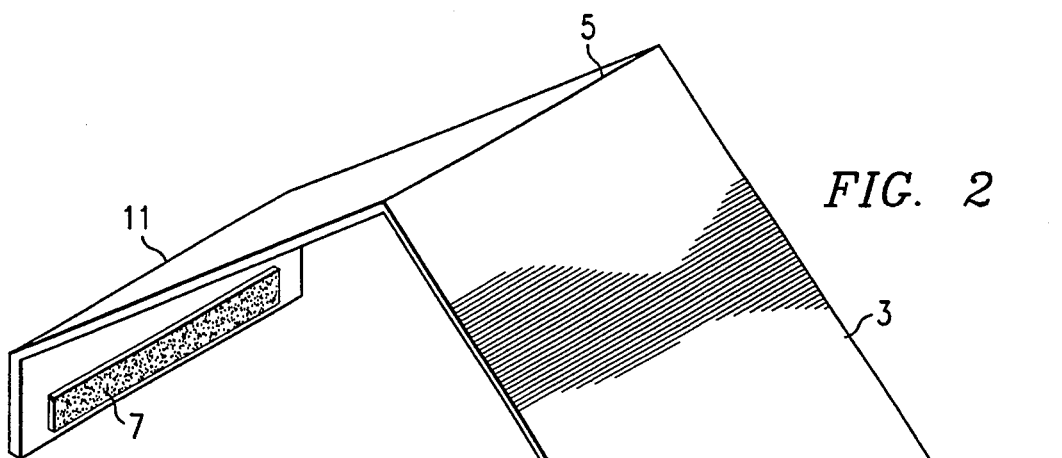
FIG. 2 is a perspective view of the sun shield of FIG. 1 shaped for attachment to an attachment device.

Referring first to FIG. 1, there is shown a bottom view of the sun shield 1 in accordance with the present invention. The sun shield 1 is formed from a rectangularly shaped rigid material 3, preferably with a light and heat reflecting surface facing outwardly from the seat to which it will be attached, preferably cardboard (corrugated paperboard). The shield 1 has a central fold line 5 parallel to the short sides of the rectangle at which the rigid material can be folded. A pair of hook and loop material (Velcro) strips 7 and 9 are secured at opposing ends of the rigid material 3 with further fold lines 11 and 13 parallel to the fold line 5 disposed closely adjacent the strips 7 and 9 and inwardly thereof. The rigid material 3 can be folded back upon itself at the fold line 5 for easy and low displacement storage. In operation, the sun shield 1 will be folded at the fold lines 5, 11 and 13 as shown in FIG. 2 for attachment to clips at the strips 7 and 9 as will be described hereinbelow.

Figure 3:
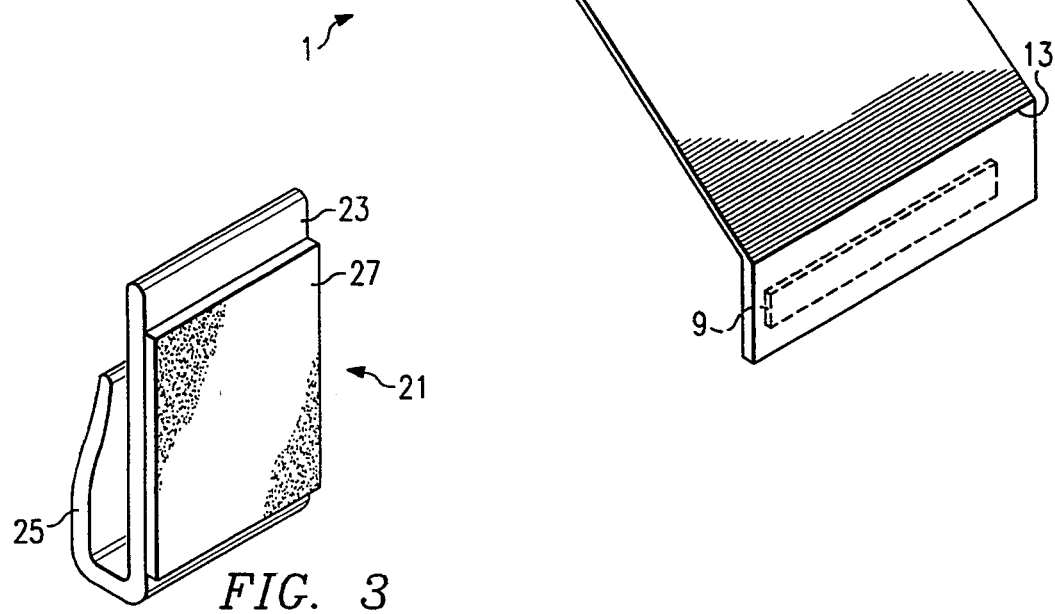
FIG. 3 is a perspective view of an attachment device in the form of a clip in accordance with the present invention.

Also provided are clips, one such clip 21 being shown in FIG. 3. The clip 21 is U-shaped with one leg 23 of the U being longer than the other leg 25. A pad of hook and loop material 27 is secured to the longer leg 25.

Figure 4:
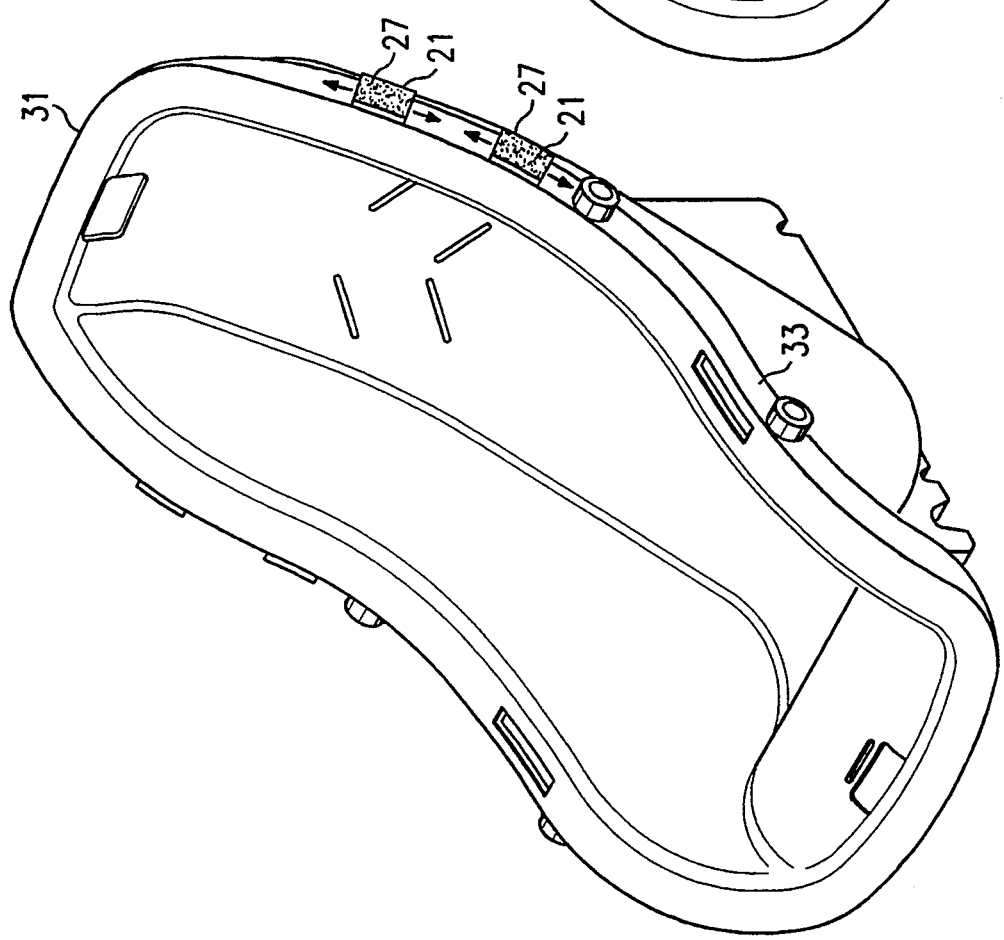
FIG. 4 is a perspective view of an infant seat with two of the attachment devices of FIG. 3 attached thereto.

Four clips 21 (two shown) are shown in FIG. 4 frictionally secured by the inward force of the legs 23 and 25 toward each other, two spaced apart clips on each side, to a flange 33 on the structural support wall of a standard infant seat 31. The short leg 25 of the clip 21 is disposed against the interior portion of the flange 33 and the longer leg 23 is disposed on the exterior portion of the flange with the hook and loop material 27 secured thereon extending outwardly. The clips 21 are slidable along the flange 33 as shown by the arrows thereon and can be retained in the position shown when the shield 1 is not in use or can be easily removed. Also, the clips can be disposed on other parts of the infant seat 31 such as, for example, the carrying handle, the frame of the built in awning or to the protective covering on the seat. Also, as an alternative to the clips 21, pressure sensitive hook and loop strips, corresponding to those on the shield, can also be used on the car seat itself. Another alternative would be to use a spring loaded variation of clips 21.

Figure 5:
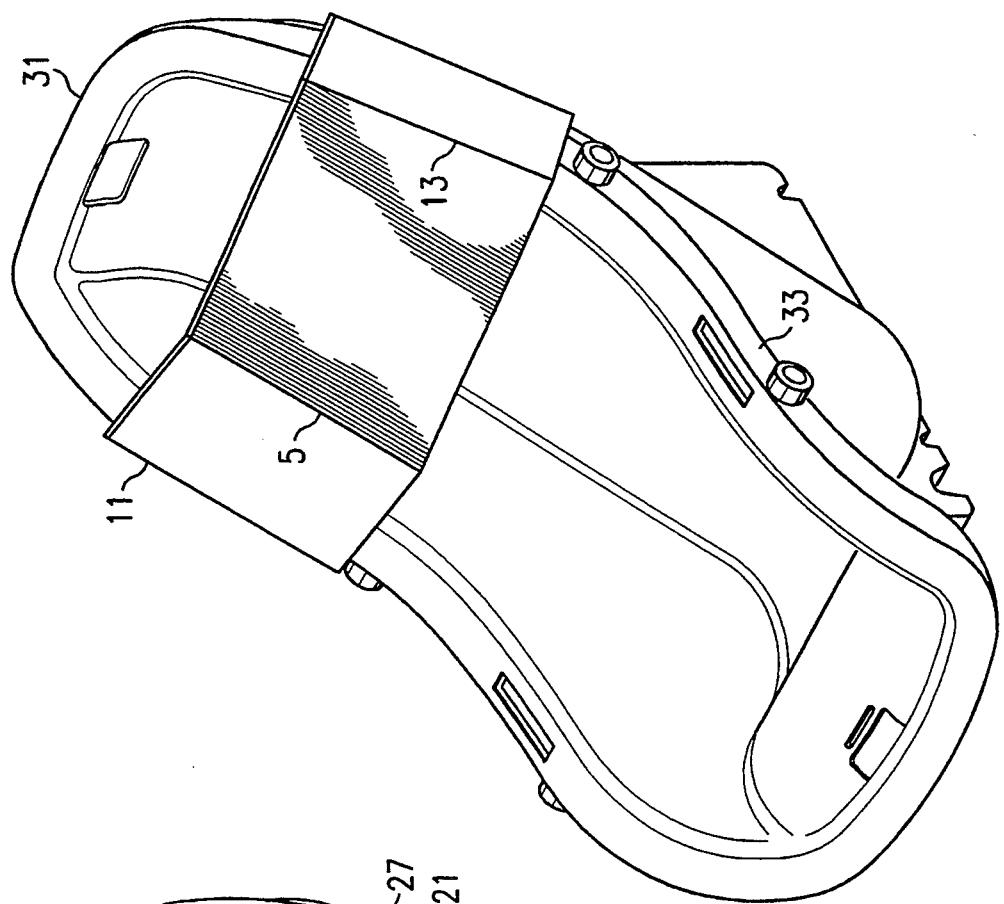
FIG. 5 is a perspective view of an infant seat with the sun shield of FIGS. 1 and 2 secured thereto in assembled condition.

The shield 1 in operating and assembled condition is shown in FIG. 5 wherein each of the strips 7 and 9 is secured to each of the pads 27 on one of the flange regions 33 on one side of the seat 31. The shield 1 is dimensioned so that the material 3 is folded at fold lines 11 and 13 and the angle of the fold at fold line 5 is such that the shield forms a V threat and is spaced from the head of a baby seated in the seat 31. The shield 1 is easily assembled as shown in FIG. 5 merely by attaching the clips 21 as shown in FIG. 4 and then attaching the strips 7 and 9 to the pads 27. The shield is removed by detaching the strips 7 and 9 from the pads The material 3 can then be folded at the fold line 5 into a substantially two dimensional rectangle and easily stored without requiring a large amount of space.

It can be seen that no tools or special skills are required to assemble or disassemble the shield of the present invention. The inherent strength of the inverted V-shape of the the subject sun shield provides a resistance to collapse or falling side-to-side, even when struck by a small force. Further, no alteration of the infant seat is required for use of the subject shield. Still further, a pattern can be disposed on the surface of the shield 1 facing the infant for aesthetic and amusement purposes. It is also readily apparent that the shield in accordance with the present invention can be moved up and down along the seat by movement of the clips 31 along the flange regions 33.

While the preferred embodiment is provided with reference to an infant seat, it is readily apparent that the shield in accordance with the present invention can be used in conjunction with other devices, such as, but not limited to strollers, baby carriages, play pens, cribs and the like.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

We claim:
1. A sun shield which comprises:
 (a) a substantially rigid sheet having
  (i) a top surface and a bottom surface;
  (ii) a pair of opposing end portions containing a portion of said top surface and said bottom surface; and
  (iii) a region intermediate said opposing end portions containing a portion of said top surface and said bottom surface secured to each of said end portions along a first line, forming an obtuse angle with each of said end portions in said bottom surface and easily foldable along said first line relative to said end portions, said region comprising a pair of planar regions, each of said planar regions extending from and contacting a different one of said end portions, said planar regions meeting along a second line and easily foldable along said second line relative to the remaining portions of said planar regions, said planar regions making an angle of less than 180 degrees with each other at said second line at said bottom surface; and
 (b) first fastening means disposed on each of said opposing end portions and on bottom surface of said sheet.

2. The shield of claim 1 wherein said second line is disposed substantially medial of said opposing end portions.

3. The shield of claim 2 further including said first foldable lines disposed adjacent each of said first fastening means.

4. The shield of claim 2 wherein said sheet is substantially rectangular and said end portions are disposed at opposing portions of the perimeter of said rectangle.

5. The shield of claim 3 wherein said sheet is substantially rectangular and said end portions are disposed at opposing portions of the perimeter of said rectangle.

6. The shield of claim 2 wherein said first fastening means is hook and loop.

7. The shield of claim 3 wherein said first fastening means is hook and loop.

8. The shield of claim 4 wherein said first fastening means is hook and loop.

9. The shield of claim 5 wherein said first fastening means is hook and loop.

10. The shield of claim 6 wherein said sheet is substantially rectangular and said end portions are disposed at opposing portions of the perimeter of said rectangle.

11. The shield of claim 2 further including second fastening means secured to a utilitarian device and said first fastening means to provide a V-shaped bend at said first line.

12. The shield of claim 4 further including second fastening means secured to a utilitarian device and said first fastening means to provide a V-shaped bend at said first line.

13. The shield of claim 6 further including second fastening means secured to a utilitarian device and said first fastening means to provide a V-shaped bend at said first line.

14. The shield of claim 8 further including second fastening means secured to a utilitarian device and said first fastening means to provide a V-shaped bend at said first line.

15. The shield of claim 10 further including second fastening means secured to a utilitarian device and said first fastening means to provide a V-shaped bend at said first line.

16. The shield of claim 15 wherein said second fastening means is a clip having hook and loop secured thereto.

* * * * *